(12) United States Patent
Resconi et al.

(10) Patent No.: US 7,799,871 B2
(45) Date of Patent: *Sep. 21, 2010

(54) 1-BUTENE POLYMERS COMPOSITION

(75) Inventors: Luigi Resconi, Ferrara (IT); Anteo Pelliconi, Rovigo (IT); Stefano Spataro, Ferrara (IT); Gilberto Moscardi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 489 days.

This patent is subject to a terminal disclaimer.

(21) Appl. No.: 11/632,616

(22) PCT Filed: Jun. 10, 2005

(86) PCT No.: PCT/EP2005/052688

§ 371 (c)(1),
(2), (4) Date: Jan. 16, 2007

(87) PCT Pub. No.: WO2006/008211

PCT Pub. Date: Jan. 26, 2006

(65) Prior Publication Data

US 2008/0319135 A1    Dec. 25, 2008

Related U.S. Application Data

(60) Provisional application No. 60/592,346, filed on Jul. 28, 2004.

(30) Foreign Application Priority Data

Jul. 22, 2004    (EP)    .................. 04103525

(51) Int. Cl.
C08F 10/04    (2006.01)
C08F 10/14    (2006.01)
C08F 110/04    (2006.01)
C08F 110/14    (2006.01)
C08F 210/00    (2006.01)
C08F 4/44    (2006.01)

(52) U.S. Cl. .............. 525/191; 526/348.6; 526/160; 526/161; 526/943; 526/348

(58) Field of Classification Search .......... 525/240, 525/191; 526/348.6, 348, 943, 160, 161
See application file for complete search history.

(56) References Cited

U.S. PATENT DOCUMENTS

| 3,671,663 | A | * | 6/1972 | Seifert et al. | .......... 174/120 SC |
| 3,894,120 | A | | 7/1975 | Frese et al. | |
| 4,298,722 | A | | 11/1981 | Collette et al. | |
| 5,852,143 | A | | 12/1998 | Sishta et al. | |
| 6,288,192 | B1 | | 9/2001 | Fujita et al. | |
| 6,359,095 | B1 | * | 3/2002 | Winter et al. | .......... 526/348.2 |
| 6,444,833 | B1 | | 9/2002 | Ewen et al. | |
| 6,635,779 | B1 | * | 10/2003 | Ewen et al. | ............ 556/11 |
| 6,900,343 | B1 | | 5/2005 | Bingel et al. | |
| 6,953,829 | B2 | | 10/2005 | Kratzer et al. | |
| 7,101,940 | B2 | | 9/2006 | Schottek et al. | |
| 7,534,848 | B2 | * | 5/2009 | Resconi et al. | .......... 526/348.6 |
| 2002/0123538 | A1 | * | 9/2002 | Zhou et al. | ............ 523/176 |
| 2006/0235173 | A1 | | 10/2006 | Resconi | |
| 2008/0027190 | A1 | | 1/2008 | Tonti et al. | |

FOREIGN PATENT DOCUMENTS

| DE | 19962814 | 6/2001 |
| DE | 19962910 | 7/2001 |
| DE | 10324541 | 12/2004 |
| EP | 172961 | 3/1986 |
| EP | 604908 | 7/1994 |
| EP | 930320 | 7/1999 |
| WO | 91/02012 | 2/1991 |
| WO | 92/00333 | 1/1992 |
| WO | 99/21899 | 5/1999 |
| WO | 99/45043 | 9/1999 |
| WO | 00/31089 | 6/2000 |
| WO | 01/21674 | 3/2001 |

(Continued)

OTHER PUBLICATIONS

L. Resconi et al., "1-Olefin Polymerization at Bis(pentamethylcyclopentadienyl)zirconium and -hafnium Centers: Enantioface Selectivity," *Macromolecules*, vol. 25(25), p. 6814-6817 (1992).

M. Vathauer et al., "Homopolymerizations of α-Olefins with Diastereomeric Metallocene/MAO Catalysts," *Macromolecules*, vol. 33(6), p. 1955-1959 (2000).

(Continued)

*Primary Examiner*—Vasu Jagannathan
*Assistant Examiner*—Irina Krylova
(74) *Attorney, Agent, or Firm*—William R. Reid

(57) ABSTRACT

A 1-butene polymer composition comprising:
a) from 5% by weight to 95% by weight of an atactic 1-butene-based polymer, having the following features:
  distribution of molecular weight Mw/Mn equal to or lower than 4;
  rr triads, measured by $^{13}$C-NMR comprised between 5% and 50%;
  no enthalpy of fusion detectable at a differential scanning calorimeter (DSC);
  intrinsic viscosity (IV) measured in tetrahydronaphtalene (THN) at 135° C. comprised between 0.85 dl/g and 5.0 dl/g; and
  infrared crystallinity lower than 0.5%;
b) from 5% by weight to 95% by weight of an isotactic 1-butene-based polymer having the following features:
  isotactic pentads (mmmm) measured by $^{13}$C-NMR, higher than 80%;
  melting point higher than 80° C.; and
  intrinsic viscosity (IV) measured in tetrahydronaphtalene (THN) at 135° C. comprised between 0.1 dl/g and 5 dl/g.

12 Claims, No Drawings

FOREIGN PATENT DOCUMENTS

| | | |
|---|---|---|
| WO | 01/44318 | 6/2001 |
| WO | 01/62764 | 8/2001 |
| WO | 02/02576 | 1/2002 |
| WO | 02/100908 | 12/2002 |
| WO | 02/100909 | 12/2002 |
| WO | 03/014107 | 2/2003 |
| WO | 03/045964 | 6/2003 |
| WO | 03/099883 | 12/2003 |
| WO | 2004/050713 | 6/2004 |
| WO | 2004/106351 | 12/2004 |
| WO | 2005/095468 | 10/2005 |
| WO | 2005/105865 | 11/2005 |
| WO | 2006/008212 | 1/2006 |

OTHER PUBLICATIONS

Q. Huang et al., "Synthesis and Characterization of High Molecular Weight Atactic Polybutene-1 with a Monotitanocene/Methylaluminoxane Catalyst System," *Journal of Polymer Science: Part A: Polymer Chemistry*, vol. 39, p. 4068-4073 (2001).

F. Zhu et al., "Syntheses of Multi-stereoblock Polybutene-1 Using Novel Monocyclopentadienyl-titanium and Modified Methylaluminoxane Catalysts," *Journal of Polymer Science: Part A: Polymer Chemistry*, vol. 37, p. 4497-4501 (1999).

Q. Huang et al., "The synthesis of high molecular weight polybutene-1 catalyzed by Cp*Ti(OBz)$_3$/MAO," *Polymer International*, vol. 50, p. 45-48 (2001).

A. Nishioka et al., "Crystallinity and Stereoregularity of Polybutene-1," *Chem. of High Polymers* (Japan), vol. 19, p. 667-671 (1962).

N. Naga et al., "Polymerization behavior of α-olefins with *rac*- and *meso*-type *ansa*-metallocene catalysts: Effects of cocatalyst and metallocene ligand," *Macromol. Chem. Phys.*, vol. 200, p. 1587-1594 (1999).

M. Vathauer, "Homo- und Copolymerisationen von Propen und höheren α-Olefinen mit verbrückten α-Olefinen mit verbrückten C$_2$-symmetrischen Bisindenylzirconocenen," University of Hamburg Dissertation, p. 25-26 (2000).

Office Action from currently pending U.S. Appl. No. 11/632,612 with mail date Jan. 27, 2009.

Response to Restriction Requirement from currently pending U.S. Appl. No. 11/632,612 with mail date Feb. 26, 2009.

Office Action from currently pending U.S. Appl. No. 11/632,612 with mail date Apr. 10, 2009.

Response to Office Action from currently pending U.S. Appl. No. 11/632,612 with mail date Jul. 9, 2009.

* cited by examiner

1-BUTENE POLYMERS COMPOSITION

This application is the U.S. national phase of International Application PCT/EP2005/052688, filed Jun. 10, 2005, claiming priority to European Patent Application 04103525.4 filed Jul. 22, 2004, and the benefit under 35 U.S.C. 119(e) of U.S. Provisional Application No. 60/592,346, filed Jul. 28, 2004; the disclosures of International Application PCT/EP2005/052688, European Patent Application 04103525.4 and U.S. Provisional Application No. 60/592,346, each as filed, are incorporated herein by reference.

The present invention relates to a 1-butene polymers composition containing atactic 1-butene polymer obtainable by using a single-site based catalyst system and an isotactic 1-butene polymer. The present invention further relates to the process for preparing said composition.

Isotactic 1-butene polymer is well known in the art. In view of its good properties in terms of pressure resistance, creep resistance, and impact strength, it is widely used for example in the manufacture of pipes for metal pipe replacement, easy-open packaging and films.

Isotactic 1-butene (co)polymers can be obtained for example by polymerizing the monomers in the presence of a stereospecific catalyst comprising: (A) a solid component comprising a Ti compound and an electron-donor compound supported on $MgCl_2$; (B) an alkylaluminum compound and, optionally, (C) an external electron-donor compound. A process of this type is disclosed in EP-A-172961 and WO99/45043. More recently isotactic 1-butene polymers have been produced by using metallocene-based catalyst systems according to the process disclosed for example in WO 02/100908, WO 02/100909 and WO 03/014107. However for certain applications there is the need of a much more soft material, either for improving the aesthetic aspect of the final resin or for improving certain mechanical characteristics such as the elastic modulus, so that the material can be used for example for extrusion, injection moulding, slush moulding or rotor moulding.

Atactic 1-butene polymer having narrow molecular weight distribution is described in example 17 of EP 604 908. In this example a polymer having an intrinsic viscosity of 1.29 dl/g is obtained by using dimethylsilanediylbis(9-fluorenyl)zirconium dimethyl. U.S. Pat. No. 6,288,192 describes an atactic 1-butene polymer having a Mw/Mn of 2.5 or less and a very high molecular weight.

In the above documents a blend among isotacticl-butene polymer and atactic 1-butene polymer is not described.

U.S. Pat. No. 4,298,722 describes a fractionable, elastomeric 1-butene polymer. Said polymer has from 30 to 80% by weight of a fraction soluble in diethyl ether. Said fraction has an infrared crystallinity value of about 1% to 15%. This value, when compared with the infrared crystallinity value of the atactic 1-butene polymer used for the composition according to the present application is quite high.

In macromolecules Vol 33. No. 6, 2000 a process for preparing a 1-butene homopolymer is described. The process uses rac and meso mixtures of dimethylsilylbis(2-methyl-4-phenylindenyl)zirconium dichloride, dimethylsilylbis(indenyl) zirconium dichloride, or dimethylsilylbis(2-methyl-4,5-benzoindenyl) zirconium dichloride. The molecular weight of the atactic 1-butene polymer are quite low they ranges from 200 kg/mol to 40 kg/mol, that corresponds to an intrinsic viscosity measured in decahydronapthalene ranging from 0.95 dl/g to 0.27 dl/g according to the parameters of the Mark-Houwink equation described in the document itself. These values correspond to an intrinsic viscosity (IV) range measured in tetrahydronaphtalene from 0.83 dl/g to 0.23 dl/g.

In the 1-butene polymer composition of the present invention the intrinsic viscosity of the 1-butene polymer is higher than the value of 0.83 dl/g described in said document. The higher molecular weight (i.e. the higher value of intrinsic viscosity) renders the composition less sticky making the latter easier to process.

An object of the present invention is therefore a 1-butene polymer composition comprising:
a) from 5% by weight to 95% by weight of an atactic 1-butene-based polymer selected from: atactic homopolymer of 1-butene, atactic copolymer of 1-butene containing up to 50% by mol of one or more alpha olefins selected from ethylene, propylene and alpha olefins of formula $CH_2\!\!=\!\!CHZ$, wherein Z is a $C_3$-$C_{10}$ alkyl group; having the following features:
  i) distribution of molecular weight Mw/Mn equal to or lower than 4;
  ii) rr triads, measured by $^{13}$C-NMR comprised between 5% and 50%;
  iii) no enthalpy of fusion detectable at a differential scanning calorimeter (DSC);
  iv) intrinsic viscosity (IV) measured in tetrahydronaphtalene (THN) at 135° C. comprised between 0.85 dl/g and 5.0 dl/g; and
  v) infrared crystallinity lower than 0.5%;
b) from 5% by weight to 95% by weight of an isotactic 1-butene-based polymer selected from isotactic homopolymer of 1-butene, isotactic copolymer of 1-butene containing up to 5% by mol of ethylene derived units, isotactic copolymer of 1-butene containing up to 50% by mol of propylene derived units or an isotactic copolymer of 1-butene and one or more alpha olefins of formula $CH_2\!\!=\!\!CHZ$, wherein Z is a $C_3$-$C_{10}$ alkyl group, containing up to 20% by mol of derived units of said alpha-olefins; having the following features:
  i) isotactic pentads (mmmm) measured by $^{13}$C-NMR, higher than 80%;
  ii) melting point higher than 80° C.; and
  iii) intrinsic viscosity (IV) measured in tetrahydronaphtalene (THN) at 135° C. comprised between 0.10 dl/g and 5.0 dl/g.

Preferably in the atactic 1-butene-based polymer component a) of the composition the distribution of molecular weight is lower than 3; more preferably it is lower than 2.5.

In the component a) the rr triads, measured by $^{13}$C-NMR are preferably comprised between 10% and 40%; more preferably rr are comprised between 20% and 30%.

In the component a) intrinsic viscosity (IV) measured in tetrahydronaphtalene (THN) at 135° C. is preferably comprised between 1.0 dl/g and 5.0 dl/g; preferably between 1.0 dl/g and 3.0 dl/g; more preferably between 1.0 dl/g and 2.5 dl/g.

In the component a) the infrared crystallinity is preferably lower than 0.3%; more preferably lower than 0.1%; even more preferably lower than 0.05%.

Preferably, in the atactic copolymer of 1-butene component a), the content of ethylene, propylene or said alpha olefins is comprised between 0.1% by mol and 20% by mol; more preferably it is comprised between 0.1% by mol and 10% by mol, even more preferably it is comprised between 0.1% by mol and 5% by mol.

Component a) is completely soluble in xylene at 0° C. wherein the solubility is measured according to the procedure described below.

Preferably atactic homopolymer of 1-butene is used as component a).

The atactic 1-butene polymers used as component a) can preferably be obtained by polymerizing 1-butene and optionally ethylene, propylene or one or more of said alpha olefins of formula $CH_2=CHZ$, (when 1-butene copolymers are used) in the presence of a single-site based catalyst system. The 1-butene polymer component a) can be obtained, for example, according to the processes described in U.S. Pat. No. 6,288,192; EP 604 908; Journal of Polymer Science, part A: polymer chemistry (2001), 39(23), 4068; Journal of Polymer Science, part A: polymer chemistry (1999), 37(24), 4497; Polymer International (2001), 50(1), 45-48.

Preferably the atactic 1-butene-based polymers, component a) is obtainable with a process comprising the step of polymerizing 1-butene and optionally one or more alpha olefins selected from ethylene, propylene and alpha olefins of formula $CH_2=CHZ$, wherein Z is a $C_3$-$C_{10}$ alkyl group, in the presence of a catalyst system obtainable by contacting:

a) at least one metallocene compound of formula (Ia) in its meso or meso-like form

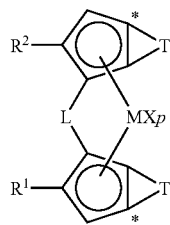
(Ia)

wherein

M is an atom of a transition metal selected from those belonging to group 3, 4, 5, 6 or to the lanthanide or actinide groups in the Periodic Table of the Elements; preferably M is titanium, zirconium or hafnium;

p is an integer from 0 to 3, preferably p is 2, being equal to the formal oxidation state of the metal M minus 2;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_4\alpha$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or benzyl radicals;

L is a divalent $C_1$-$C_{40}$ hydrocarbon radical optionally containing heteroatoms belonging to groups 13-17 of the Periodic Table of the Elements or a divalent silylene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylene radical containing up to 5 silicon atoms such as $SiMe_2$, $SiPh_2$; preferably L is a group $(Z(R'')_2)_n$ wherein Z is a carbon or a silicon atom, n is 1 or 2 and R" is a $C_1$-$C_{20}$ hydrocarbon radical optionally containing heteroatoms belonging to groups 13-17 of the Periodic Table of the Elements; preferably R" is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$;

$R^1$ and $R^2$, equal to or different from each other, are $C_1$-$C_{40}$ hydrocarbon radicals optionally containing heteroatoms belonging to groups 13-17 of the Periodic Table of the Elements; preferably they are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^2$ are linear, saturated or unsaturated $C_1$-$C_{20}$-alkyl radicals; more preferably $R^1$ and $R^2$ are methyl or ethyl radicals;

T, equal to or different from each other, is a moiety of formula (IIa), (IIb) or (IIc):

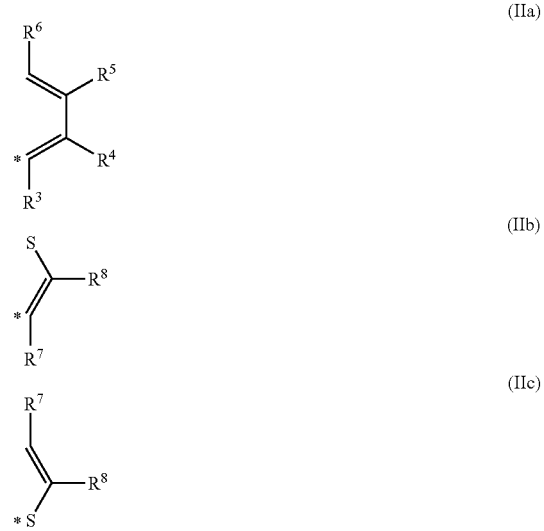

wherein the atom marked with the symbol * bonds the atom marked with the same symbol in the compound of formula (Ia);

$R^3$ is a $C_1$-$C_{40}$ hydrocarbon radical optionally containing heteroatoms belonging to groups 13-17 of the Periodic Table of the Elements; preferably $R_3$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_4\alpha$-arylalkyl or a $C_7$-$C_{40}$-alkylaryl radical; optionally containing heteroatoms belonging to groups 13-17 of the Periodic Table of the Elements; more preferably $R^3$ is a linear or branched, $C_1$-$C_{20}$-alkyl $C_6$-$C_{40}$-aryl, $C_7$-$C_{40}$-arylalkyl radical; even more preferably $R^3$ is a $C_6$-$C_{20}$-aryl radical optionally substituted with one or more $C_1$-$C_{10}$ alkyl groups;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^4$ and $R^6$, equal to or different from each other, are hydrogen atoms or linear or branched, cyclic or acyclic, $C_1$-$C_{40}$- alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably $R^4$ and $R^6$ are hydrogen atoms;

$R^5$ is a $C_1$-$C_{40}$ hydrocarbon radical optionally containing heteroatoms belonging to groups 13-17 of the Periodic Table of the Elements; preferably $R^5$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^5$ is a linear or branched, saturated or unsaturated $C_1$-$C_{20}$-alkyl radical; even more preferably $R^5$ is a methyl or ethyl radical;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ and $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^8$ is a hydrogen atom or a linear or branched, saturated or unsaturated $C_1$-$C_{20}$-alkyl radical; more preferably $R^8$ is a methyl or ethyl radical;

preferably $R^7$ is a hydrogen atom or a $C_1$-$C_{40}$-alkyl, $C_6$-$C_{40}$-aryl or a $C_7$-$C_{40}$-arylalkyl radical; more preferably $R^7$ is a group of formula (III)

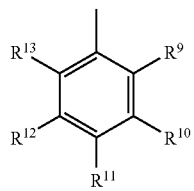

(III)

wherein $R^9$, $R^{10}$, $R^{11}$, $R^{12}$ and $R^{13}$, equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements; preferably $R^9$, and $R^{12}$ are a hydrogen atoms; $R^{10}$, $R^{11}$ and $R^{13}$ are preferably hydrogen atoms or linear or branched, cyclic or acyclic, $C_1$-$C_{10}$-alkyl radicals;

b) an alumoxane or a compound capable of forming an alkyl metallocene cation; and optionally c) an organo aluminum compound.

This kind of process is described in EP 04101912.6 and PCT/EP2005/004506. For the purpose of the present invention the term "meso form" means that the same substituents on the two cyclopentadienyl moieties are on the same side with respect to the plane containing the zirconium and the centre of the said cyclopentadienyl moieties. "Meso-like form" means that the bulkier substituents of the two cyclopentadienyl moieties on the metallocene compound are on the same side with respect to the plane containing the zirconium and the centre of the said cyclopentadienyl moieties as shown in the following compound:

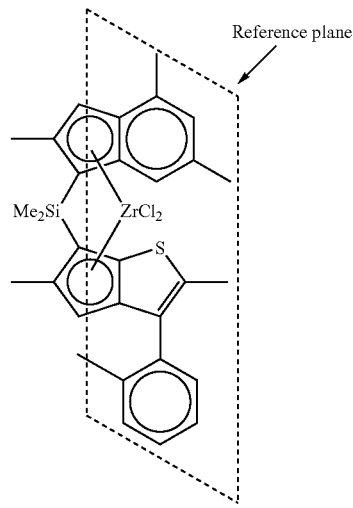

The isotactic 1-butene-based polymer selected from isotactic homopolymer of 1-butene, isotactic copolymer of 1-butene containing up to 5% by mol of ethylene derived units, isotactic copolymer of 1-butene containing up to 50% by mol of propylene derived units or an isotactic copolymer of 1-butene and one or more alpha olefins of formula $CH_2\!\!=\!\!CHZ$, wherein Z is a $C_3$-$C_{10}$ alkyl group, containing up to 20% by mol of derived units of said alpha-olefins, used as component b), has preferably isotactic pentads (mmmm) measured by $^{13}$C-NMR, higher than 85%; more preferably higher than 90%; even more preferably higher than 95%.

The melting point of component b) is preferably higher than 90° C.; more preferably the melting point is higher than 100° C.; even more preferably higher than 104° C.

The intrinsic viscosity (IV) measured in tetrahydronaphtalene (THN) at 135° C. is comprised between 0.5 dl/g and 4.0 dl/g; preferably it is comprised between 1.0 dl/g and 3.0 dl/g, even more preferably the intrinsic viscosity (IV) is higher than 1.1 dl/g and lower than 2.5 dl/g.

Preferably 1-butene homopolymer is used as component b).

The isotactic 1-butene-based polymer useful as component b) according to the present invention can be obtained either by using titanium-based catalyst system supported on $MgCl_2$ or by using single-site based catalyst system such as for example metallocene-based catalyst system. Useful processes for obtaining this kind of polymers are described for example in WO 99/45043; WO 03/099883 EP 172961, WO 02/100908, WO 02/100909 WO 03/014107 and EP03101304.8.

When component b) of the composition according to the present invention is obtained by using a single-site based catalyst system; preferably a metallocene-based catalyst system, it is endowed with a molecular weight distribution (Mw/Mn) equal to or lower than 5; preferably lower than 4; more preferably lower than 3.

When component b) is obtained by using titanium-based catalyst system supported on $MgCl_2$, it is endowed with a molecular weight distribution higher than 3; preferably higher than 4; more preferably higher than 5.

In one embodiment the intrinsic viscosity (IV) of the component a) is equal to or higher than 70%; preferably higher than 80% of the intrinsic viscosity of component b). This feature enhances the compatibility of the two components in the compositions of the present invention.

With the 1-butene composition object of the present invention it is possible to soft the isotactic 1-butene-based polymers in a very efficient way without substantially decreasing its melting point so that to achieve a new material that can be used for several applications in order to replace, for example, polyvinylchloride, polyuretane or styrene block copolymers. Moreover since both component a) and b) are mainly based on 1-butene, the two polymers are completely miscible allowing to obtain a very intimate blend. Moreover the presence of the isotactic 1 butene polymer, even in very small quantities, has the advantage to make the resulting composition non sticky, even if it retains most of the properties of the atactic 1-butene polymers, moreover in this way the processability of the composition is greatly improved.

Preferably in the 1-butene polymer composition, component a) ranges from 20% to 80% by weight and component b) ranges from 80% to 20% by weight; more preferably component a) ranges from 30% to 70% by weight and component b) ranges from 70% to 30% by weight.

The following compositions are also possible:

| component a) | component b) |
| --- | --- |
| 10-20% by weight | 90-80% by weight |
| 20-30% by weight | 80-70% by weight |
| 30-40% by weight | 70-60% by weight |
| 40-50% by weight | 60-50% by weight |
| 50-60% by weight | 50-40% by weight |
| 60-70% by weight | 40-30% by weight |
| 70-80% by weight | 30-20% by weight |
| 80-90% by weight | 20-10% by weight |

The 1-butene composition object of the present invention can be obtained either by mechanically mixing component a) and b) i.e. for example by co-extruding together component a) and b), by mixing the solutions of component a) and component b) and then removing the solvent, or by solubilizing component b) in component a) heated so that to lower the viscosity; or by a reactor blend, i.e. in this case, the composition is produced directly in one or more reactors without the need of a mechanical blending.

When the composition of the present invention is produced directly in two or more reactors in series, different processes are possible, taking into account that component a) can be produced by using a single-site based catalyst system and component b) can be produced either by using a titanium-based catalyst system supported on $MgCl_2$ and by using a single-site based catalyst system as described above. For example, component a) can be obtained in a first step by using one or more reactors according to the processes described above and then, in a second step, the polymerization mixture can be feed in a second reactor or in a second group of reactors in series in which component b) is obtained by using either a titanium-based catalyst system supported on $MgCl_2$ and a single-site based catalyst system. Otherwise in a first step component b) can be obtained in one or more reactors by using a single-site based catalyst system and in a second step the polymerization mixture can be feed in the second reactors or group of reactors in which component a) is prepared The useful processes can be summarised in the following scheme

| Embodiment | first step | | Second step | |
| --- | --- | --- | --- | --- |
| | component | catalyst system | component | catalyst system |
| a) | component a) | single-site | component b) | Titanium-based |
| b) | component a) | single-site | component b) | single-site |
| c) | component b) | Titanium-based | component a) | single-site |
| d) | component b) | single-site | component a) | single-site |

In a particular embodiment, the 1-butene polymer composition object of the present invention can be obtained in one step by using one or more reactors r and a mixture of two compatible catalyst systems one of them producing the atactic component a) and the other one producing the 1-butene-based polymer component b).

A single-site based catalyst system mainly comprises a transition metal organic compound, such as a metallocene compound, and a cocatalyst, usually alumoxanes or boron compounds. When both components a) and b) of the composition according to the present invention are obtained by using single-site based catalyst systems, it is possible to use two transition metal organic compounds, and one cocatalyst able to activate both the transition metal organic compounds. In this case one transition metal organic compound produces the component a) and the second transition metal organic compound produces the component b) and the same cocatalyst is used.

For example, the transition metal compound described in U.S. Pat. No. 6,288,192 can be used together with the metallocene compound described in EP03101304.8 both being activated by alumoxanes or boron compounds.

Thus, a further object of the present invention is a process for producing a poly(1-butene) composition as described above comprising the step of obtaining:

a) from 5% by weight to 95% by weight of a 1-butene-based polymer selected from: atactic homopolymer of 1-butene or an atactic copolymer of 1-butene containing up to 50% by mol of one or more alpha olefins selected from ethylene, propylene and alpha olefins of formula $CH_2\!=\!CHZ$, wherein Z is a $C_3$-$C_{10}$ alkyl group, having the features described above by contacting one or more monomers under polymerization conditions in the presence of a catalyst system containing at least one transition metal organic compound; and b) from 5% by weight to 95% by weight of an isotactic 1-butene-based polymer selected from isotactic homopolymer of 1-butene, isotactic copolymer of 1-butene containing up to 5% by mol of ethylene derived units, isotactic copolymer of 1-butene containing up to 50% by mol of propylene derived units or an isotactic copolymer of 1-butene and one or more alpha olefins of formula $CH_2\!=\!CHZ$, wherein Z is a $C_3$-$C_{10}$ alkyl group, containing up to 20% by mol of derived units of said alpha-olefins, having the features described above by contacting one or more monomers under polymerization conditions in the presence of a catalyst system containing at least one transition metal organic compound;

Characterized in that components a) and b) are obtained simultaneously in the same reactor.

Preferably the transition metal organic compounds used in steps a) and b) are metallocene compounds.

For the purpose of the present invention, transition metal organic compounds are compounds able to give polymers having a narrow molecular weight distribution (Mw/Mn) i.e. a molecular weight distribution lower than 5; preferably lower than 4; more preferably lower than 3, being single-site catalyst components. Examples of such compounds are metallocene compounds or the transition metal compound described in U.S. Pat. No. 6,288,192.

In a preferred embodiment, in order to carry out the above described process, it is possible to use the racemic or racemic-like form and meso or meso-like form of a particular class of metallocene compounds. Therefore, a further object of the present invention is a process for producing a poly(1-butene composition) described above comprising the step of polymerizing 1-butene and optionally ethylene, propylene or one or more alpha olefins of formula $CH_2=CHZ$, wherein Z is a $C_3$-$C_{10}$ alkyl group, in the presence of a catalyst system obtainable by contacting:

a) at least a metallocene compound of formula (Ia) in the meso or meso-like form

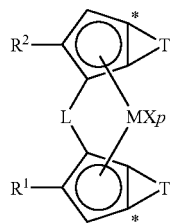

(Ia)

wherein

M is an atom of a transition metal selected from those belonging to group 3, 4, 5, 6 or to the lanthanide or actinide groups in the Periodic Table of the Elements; preferably M is titanium, zirconium or hafnium;

p is an integer from 0 to 3, preferably p is 2, being equal to the formal oxidation state of the metal M minus 2;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, $SiPhMe$, $SiMe(SiMe_3)$, $CH_2$, $(CH_2)_2$, and $C(CH_3)_2$;

$R^1$ and $R^2$, equal to or different from each other, are $C_1$-$C_{40}$ hydrocarbon radicals optionally containing heteroatoms belonging to groups 13-17 of the Periodic Table of the Elements; preferably they are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^2$ are linear or branched, saturated or unsaturated $C_1$-$C_{20}$-alkyl radicals; more preferably $R^1$ and $R^2$ are methyl or ethyl radicals;

T, equal to or different from each other, is a moiety of formula (IIa), (IIb) or (IIc):

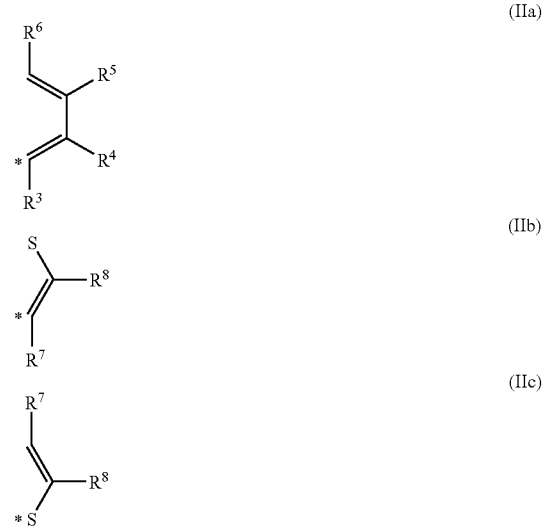

wherein the atom marked with the symbol * bonds the atom marked with the same symbol in the compound of formula (Ia);

$R^3$ is a $C_1$-$C_{40}$ hydrocarbon radical optionally containing heteroatoms belonging to groups 13-17 of the Periodic Table of the Elements; preferably $R_3$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-arylalkyl or a $C_7$-$C_{40}$-alkylaryl radical; optionally containing heteroatoms belonging to groups 13-17 of the Periodic Table of the Elements; more preferably $R^3$ is a linear or branched, $C_1$-$C_{20}$-alkyl $C_6$-$C_{40}$-aryl, $C_7$-$C_{40}$-arylalkyl radical; even more preferably $R^3$ is a $C_6$-$C_{20}$-aryl radical optionally substituted with one or more $C_1$-$C_{10}$ alkyl groups;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^4$ and $R^6$, equal to or different from each other, are hydrogen atoms or linear or branched, cyclic or acyclic, $C_1$-$C_{40}$- alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably $R^4$ and $R^1$ are hydrogen atoms;

$R^5$ is a $C_1$-$C_{40}$ hydrocarbon radical optionally containing heteroatoms belonging to groups 13-17 of the Periodic Table of the Elements; preferably $R^5$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^5$ is a linear or branched, saturated or unsaturated $C_1$-$C_{20}$-alkyl radical; even more preferably $R^5$ is a methyl or ethyl radical;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ and $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^8$ is a hydrogen atom or a linear or branched, saturated or unsaturated $C_1$-$C_{20}$-alkyl radical; more preferably $R^8$ is a methyl or ethyl radical;

preferably $R^7$ is a $C_1$-$C_{40}$-alkyl, $C_6$-$C_{40}$-aryl or a $C_7$-$C_{40}$-arylalkyl; more preferably $R^7$ is a group of formula (III)

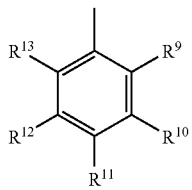

(III)

wherein $R^9$, $R^{10}$, $R^{11}$, $R^{12}$ and $R^{13}$, equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements; preferably $R^9$, and $R^{12}$ are a hydrogen atoms; $R^{10}$, $R^{11}$ and $R^{13}$ are preferably hydrogen atoms or linear or branched, cyclic or acyclic, $C_1$-$C_{10}$-alkyl radicals;

b) at least a metallocene compound of formula (Ib) in the racemic (rac) or racemic-like form

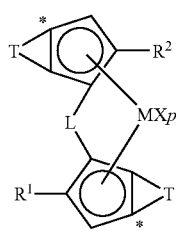

(Ib)

wherein $R^1$, $R^2$, T, L, M, X and p have been described above; and wherein $R^1$, $R^2$, T, L, M, X and p have been described above; and wherein the atoms marked with the symbol * bonds the atom marked with the same symbol in the moieties of formula (IIa), (IIb) or (IIc)

c) an alumoxane or a compound capable of forming an alkyl metallocene cation; and optionally d) an organo aluminum compound.

Preferably the ratio between the racemic or the racemic like form and the meso form or the meso-like form and the ranges from 10:90 to 90:10; more preferably from 20:80 to 80:20; even more preferably from 30:70; 70:30.

In one embodiment the compounds of formulas (Ia) and (Ib) have respectively the following formulas (IVa) or (IVb)

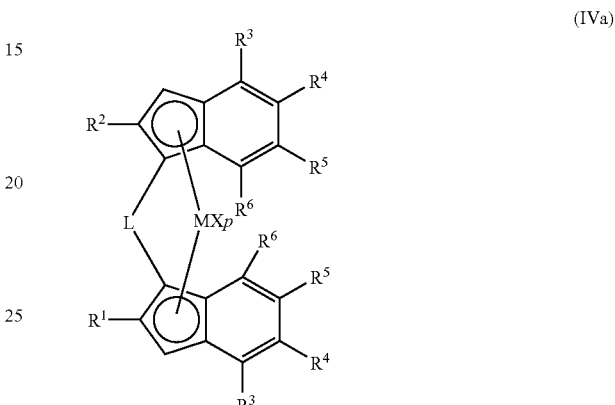

(IVa)

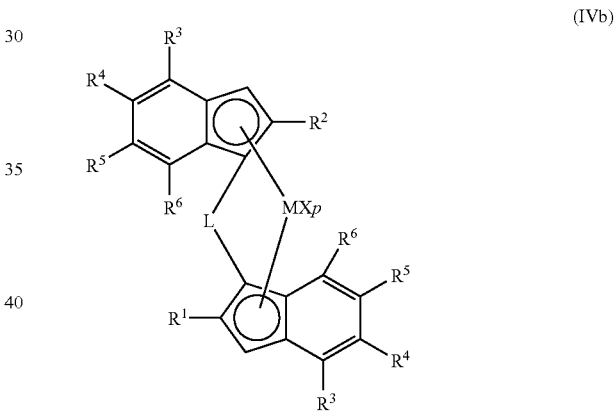

(IVb)

wherein

M, X, p, L, $R^1$, $R^2$, $R^3$, $R^4$, $R^5$ and $R^6$ have the above described meaning.

In an alternative embodiment the compounds of formulas (Ia) and (Ib) have respectively the following formulas (Va) or (Vb)

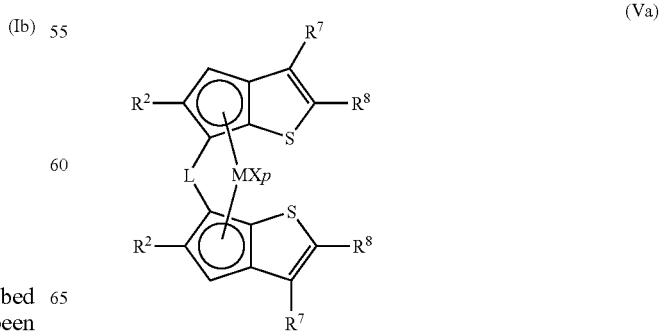

(Va)

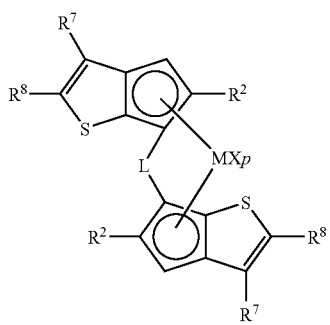

(Vb)

wherein M, X, p, L, R$^1$, R$^2$, R$^7$ and R$^8$ have the above described meaning.

Metallocene compounds of formula (Ia) and (ib) are well known in the art, they can be prepared according to known procedure, such as those described in WO 01/44318, WO 03/045964, PCT/EP02/13552 and DE 10324541.3.

What it is meant for meso or meso like form is explained above. For the purpose of the present invention the term "racemic form" means that the same substituents on the two cyclopentadienyl moieties are on the opposite side with respect to the plane containing the zirconium and the centre of the said cyclopentadienyl moieties. "racemic-like form" means that the bulkier substituents of the two cyclopentadienyl moieties on the metallocene compound are on the opposite side with respect to the plane containing the zirconium and the centre of the said cyclopentadienyl moieties as shown in the following compound:

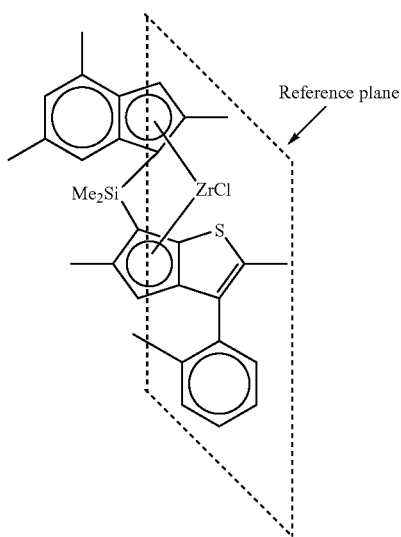

With said process it is possible to obtain the poly(1-butene) composition object of the present invention in an easy and economic way and in high yields. In fact the metallocene compounds having C$_1$ symmetry such as the metallocene compound of formula (Ia) are usually obtained from the synthesis in a mixture of racemic and meso form, the meso form is usually inactive or it produces polymer having very low molecular weight. The applicant has surprisingly found that the meso form of the compound of formula (Ia) gives atactic high molecular weight poly(1-butene) in high yield. Therefore it is possible to use the racemic and meso mixture of the metallocene compound as such without the need of further purification in order to separate the two isomeric forms for achieving the composition object of the present invention. Moreover by regulating the racemic/meso ratio of the metallocene compound of formula (Ia) it is possible to achieve poly(1-butene) compositions having different amounts of component a) or b).

Preferably in said process the metallocene compound of formula (Ia) and the metallocene compound of formula (Ib) have the same structure being different only for the spatial configuration (racemic or racemic-like and meso or meso-like). In this way the further advantage that it is possible to achieve is that the molecular weight distribution (Mw/Mn) of the 1-butene polymer composition obtained is lower than 3.5; preferably lower than 3; even more preferably lower than 2.5.

Alumoxanes used as component b) or c) in the above processes can be obtained by reacting water with an organoaluminium compound of formula H$_j$AlU$_{3-j}$ or H$_j$Al$_2$U$_{6-j}$, where the U substituents, same or different, are hydrogen atoms, halogen atoms, C$_1$-C$_{20}$-alkyl, C$_3$-C$_{20}$-cyclalkyl, C$_6$-C$_{20}$-aryl, C$_7$-C$_{20}$-alkylaryl or C$_7$-C$_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

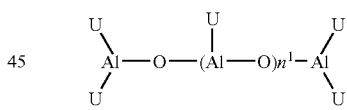

can be used in the case of linear compounds, wherein n$^1$ is 0 or an integer of from 1 to 40 and the substituents U are defined as above; or alumoxanes of the formula:

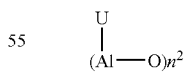

can be used in the case of cyclic compounds, wherein n$^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are:
tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Among the above aluminium compounds, trimethylaluminium (TMA), triisobutylaluminium (TIBA), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formulas (Ia) and (Ib) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-bimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Organic aluminum compounds used as compound c) or d) are those of formula $H_jAlU_{3-j}$ or $H_jAl_2U_{6-j}$ as described above.

The polymerization process of the present invention can be carried out in liquid phase, optionally in the presence of an inert hydrocarbon solvent. Said hydrocarbon solvent can be either aromatic (such as toluene) or aliphatic (such as propane, hexane, heptane, isobutane, cyclohexane and 2,2,4-trimethylpentane). Preferably, the polymerization process of the present invention is carried out by using liquid 1-butene as polymerization medium.

The polymerization temperature preferably ranges from 0° C. to 250° C.; preferably comprised between 20° C. and 150° C. and, more particularly between 40° C. and 90° C.

The intrinsic viscosity (I.V.) was measured in tetrahydronaphtalene (THN) at 135° C.

The melting points of the polymers ($T_m$) were measured by Differential Scanning Calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$).

Molecular weight parameters and molecular weight distribution for all the samples were measured using a Waters 150 C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times 10^{-4}$, dL/g and $K_{PB}=1.78\times 10^{-4}$ dL/g for polystyrene and poly-1-butene respectively. The Mark-Houwink exponents a were assumed to be 0.706 for polystyrene and 0.725 for poly-1-butene. Even though, in this approach, the molecular parameters obtained were only an estimate of the hydrodynamic volume of each chain, they allowed a relative comparison to be made.

$^{13}$C-NMR spectra were acquired on a DPX400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^{1}$H-$^{13}$C coupling. About 3000 transients were stored in 32 K data points using a spectral window of 6000 Hz. The isotacticity of metallocene-made PB is measured by $^{13}$C NMR, and is defined as the relative intensity of the mmmm triad peak of the diagnostic methylene of the ethyl branch. This peak at 27.73 ppm was used as internal reference. Pentad assignments are given according to *Macromolecules*, 1992, 25, 6814-6817. The triad content of atactic 1-butene polymer component a) was obtained by integrating the are of the peaks from 26.92 ppm to 26.43 ppm.

The side chain methylene region of PB spectrum was fitted using the routine for deconvolution included in the Bruker WIN-NMR program. The mmmm pentad and the pentads related to the single unit error (mmmr, mmrr and mrrm) were fitted using Lorenzian lineshapes, allowing the program to change the intensity and the width of the lines. As a result the relative intensities of those signals were obtained. These results were used for the statistical modelling of pentad distributions using an enantiomorphic site model, in order to obtain the complete pentad distribution, from which the triad distribution is derived.

Infrared crystallinity was determined from the infrared absorption spectrum of about 1 mm thin film of the polymer by using the absorptions A at 1221 cm$^{-1}$ and 1151 cm$^{-1}$ in the equation:

$$\text{crystallinity} = \frac{\left(\frac{A_{1221}}{A_{1151}}\right)_{solid} - 0.76}{5.43 - 0.76}$$

The equation is described in Chem. of High Polymers (Japan) 19, 667 (1962) by Nishioka and Yanagisawa.

The 1-butene polymer composition object of the present invention can be easily fractionated by subjecting the composition to fractionation with xylene according to the procedure described below (Xylene solubles at 0° C.). In this way the atactic component a) remains in solution, while the isotactic component b) is insoluble at 0° C. When the composition is subjected to diethyl ether extraction the atactic component a) that taken alone results to be completely soluble in this solvent, cannot be completely separated from component b). Without wishing to be bound by a theory we believe that this can be explained by the fact that component a) and component b) are so intimately mixed that diethyl ether is not able to swell the component b) lamellas so that to be able to contact and solubilize all the component a) present in the composition. On the contrary when the composition is subjected to xylene fractionation according to the procedure described below, since all the composition is solubilized, with a subsequent precipitation of component a) the separation is complete.

This fact confirms that component a) and component b) of the 1-butene polymer composition of the present invention are completely intimately dispersed allowing the composition to maintain the best properties of the two components. In fact, for example, the composition retains the melting point of component b).

The following examples are give for illustrative purpose and do not intend to limit the present invention.

EXAMPLES

Xylene Solubles at 0° C.

A sample of 2.5 of the reactor composition prepared above was suspended in 250 ml of xylene previously distilled. The mixture was heated so as to reach the temperature of 135° C. in about 30 minutes while gently stirring under a light nitrogen flow. Once the temperature of 135° C. has been reached, to complete the sample dissolution, the mixture has been kept at 135° for another 30 minutes.

Once the dissolution step has been concluded, the solution was air-cooled under stirring till it reaches a temperature of about 100° C. The flask containing the solution was then placed in a Dewar vessel with a water and ice bath, so that the temperature inside the flask falls to 0° C. The solution is kept at 0° C. under stirring for 1 hour, so as to complete the crystallisation of the insoluble.

The obtained mixture was filtered through a short stem glass funnel and a quick filtering paper filter. If the filtrate is not completely limpid, the filtration is repeated. During the filtration step, the mixture is kept at 0° C. Once the filtration is finished, the filtrate has been balanced at 25° C., and then two 50-ml aliquots have been placed into two volumetric flasks.

One of the two 50-ml filtrate aliquots has been transferred into a previously calibrated aluminium pan (The aluminium pans are to be kept in a muffle furnace at 500° C. for 30 minutes before usage). The aluminium pan has been heated to 140° C. so to evaporate the solvent under a light nitrogen flow and, at the same time, collect and condense the evaporated solvent vapours. Once the solvent evaporation is completed, the pan has been placed in a vacuum (200-400 mbar) oven at 75-80° C. and under nitrogen flow so as to dry the content till constant weight (total soluble). This procedure has been repeated for the 50-ml second aliquot of filtrate.

In parallel an aliquot of 50 ml of xylene was subjected to the same evaporation procedure in order to have a blank reference.

The soluble fraction in o-xylene at 0° C. (total soluble) is expressed as a weight percentage with the following general formula:

$$XS\% = \frac{\left(\left(\frac{M_{r_1}+M_{r_2}}{2}\right)-\left(M_b \times \left(\frac{V_r}{V_b}\right)\right)\right) \times V_i}{M_i \times V_r} \times 100 \quad (1)$$

where the symbols stand for the following:
XS %=weight percentage of the total soluble fraction;
$M_{r_1}$=first aliquot residue on evaporation;
$M_{r_2}$=second aliquot residue on evaporation;
$M_b$=blank residue on evaporation;
$M_i$=starting sample weight;
$V_r$=evaporated solution volume;
$V_b$=evaporated blank volume;
$V_i$=starting solvent volume.

The insoluble fraction in o-xylene at 0° C. (total soluble) is expressed as a weight percentage with the following general formula:

$$XI\% = 100 - XS\% \quad (2)$$

where the symbols stand for the following:
XI=insoluble fraction weight percentage;
XS %=total soluble weight percentage.

Preparation of Components a) General Procedure meso dimethylsilandiylbis-6-[2,5-dimethyl-3-(2'-methyl-phenyl)cyclopentadienyl-[1,2-b]-thiophene]zirconium dichloride (A-1) was prepared according to WO 01/44318.

Polymerization

The catalyst mixture was prepared by dissolving 3 mg of the metallocene (A-1) in 4-8 ml of toluene with the proper amount of the MAO solution (Al(MAO)/Zr ratios=500), obtaining a solution which was stirred for 10 min at room temperature before being injected into the autoclave.

6 mmol of Al(1-Bu)$_3$ (TIBA) (as a 1 M solution in hexane) and 1350 g of 1-butene were charged, at room temperature, in a 4-L jacketed stainless-steel autoclave, equipped with magnetically driven stirrer and a 35-mL stainless-steel vial, connected to a thermostat for temperature control, and previously purified by washing with an Al(1-Bu)$_3$ solution in hexanes and dried at 50° C. in a stream of nitrogen. The autoclave was then thermostatted at the polymerization temperature reported in table 1 and the catalyst system, prepared as reported above, was injected in the autoclave by means of nitrogen pressure through the stainless-steel vial. The polymerization was carried out at constant temperature, for 1 hour. Then stirring is interrupted; the pressure into the autoclave is raised to 20 bar-g with nitrogen. The bottom discharge valve is opened and the 1-butene/poly-1-butene mixture is discharged into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C. The polymers obtained were extracted with diethyl ether according to the method described above. The samples resulted completely soluble in diethyl ether (100%).

The polymerization conditions and the characterization data of the obtained polymers are reported in Table 1.

TABLE 1

| comp | $T_{pol}$ ° C. | Activity (Kg$_{PB}$/g$_{Met}$*h) | I.V. (dL/g, THN) | $M_w/M_n$ | rr % | enthalpy ($\Delta H_f$) | cristal-linity (IR) |
|---|---|---|---|---|---|---|---|
| a1 | 60 | 86 | 1.8 | 2.5 | 29.1 | n.d. | 0.026 |
| a2 | 70 | 124 | 1.3 | 2.6 | 28.5 | n.d. | 0.023 | n.d. not detectable

Preparation of Component b)

Component b1) was prepared according to the procedure described in WO 02/100908 as follows.

Rac dimethylsilandiylbis-6-[2,5-dimethyl-3-(2'-methyl-phenyl)cyclopentadienyl-[1,2-b]-thiophene]zirconium dichloride (A-2) was prepared according to WO01/44318.

The catalyst mixture was prepared by dissolving 3 mg of the metallocene (A-2) in 4-8 ml of toluene with the proper amount of the MAO solution (Al(MAO)/Zr ratios=200), obtaining a solution which was stirred for 10 min at room temperature before being injected into the autoclave.

6 mmol of Al(i-Bu)$_3$ (TIBA) (as a 1 M solution in hexane) and 1350 g of 1-butene were charged, at room temperature, in a 4-L jacketed stainless-steel autoclave, equipped with magnetically driven stirrer and a 35-mL stainless-steel vial, connected to a thermostat for temperature control, and previously purified by washing with an Al(1-Bu)$_3$ solution in hexanes and dried at 50° C. in a stream of nitrogen. The autoclave was then thermostatted at the polymerization temperature reported in table 1 and the catalyst system, prepared as reported above, was injected in the autoclave by means of nitrogen pressure through the stainless-steel vial. The polymerization was carried out at constant temperature, for 1 hour. Then stirring is interrupted; the pressure into the autoclave is raised to 20 bar-g with nitrogen. The bottom discharge valve is opened and the 1-butene/poly-1-butene mixture is discharged into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C. The polymer samples resulted to be completely unsoluble in diethyl ether (solunility in diethyl ether 0%) according to the test carried out as described above.

The polymerization conditions and the characterization data of the obtained polymers are reported in Table 2.

TABLE 2

| comp | $T_{pol}$ ° C. | Activity (Kg$_{PB}$/g$_{Met}$*h) | I.V. (dL/g, THN) | $M_w/M_n$ | mmmm % | Tm ° C. |
|---|---|---|---|---|---|---|
| b1 | 70 | 132 | 1.3 | 2.2 | >99 | 108 |

Component b2) was prepared according to example 1 of WO 03/099883. The characteristics of the 1-butene homopolymer obtained are reported in table 3.

TABLE 3

| comp | I.V. (dL/g, THN) | $M_w/M_n$ | mmmm % | Tm ° C. |
|---|---|---|---|---|
| b2 | 2.3 | 5.1 | >97% | 116 |

Preparation of the Compositions—General Procedure

Various combination of components a) and b) described above were co-extruded in by using a Brandbury extruder. 0.1% by weight of Irganox™ 1010 as stabilizer was added in each composition. These compositions were tested according to ASTM D 5023, ISO 527, ISO 868 and ISO 178.

For the latter the compression moulded plaques were aged in an autoclave at 2000 Bar for 10 min in an oil bath at room temperature. The characterization of the compositions are reported in table 4

TABLE 4

| | comp 1 | comp 2 | comp 3 | comp 4 | comp 5 |
|---|---|---|---|---|---|
| component a % by weigh (kind) | 50 (a1) | 50 (a2) | 50 (a1) | 60 (a1) | 70 (a1) |
| component b % by weigh (kind) | 50 (b2) | 50 (b2) | 50 (b1) | 40 (b1) | 30 (b1) |
| Tensile modulus (MPa) | n.a. | n.a. | 78 | 30 | 6 |
| Flexural modulus (MPa) | n.a. | n.a. | 38 | 16 | 8 |
| Elongation at break (%) | 446 | 399 | 514 | 615 | 796 |
| Strength at break (MPa) | 9.6 | 12 | 11.7 | 9.9 | 6 |
| Hardness Shore A (D) | n.a. | n.a. | 70 | 64 | 60 |
| melting point (° C.) | 116 | 116 | 108 | 108 | 108 | n.a. not available

Reactor Compositions

Catalyst System

The catalyst system was prepared according to the procedure described in "Example 1 Preparation of catalyst system C-1" of EP 04101020.8, by using 4.5 mg of a mixture of A-1 and A-2 1:1; Altot/Zr 200 and a ratio Methylalumoxane (MAO)/Triisobutylaluminum (TIBA) 2:1.

1-butene Polymerization, General Procedure.

A 4-L jacketed stainless-steel autoclave, equipped with a magnetically driven stirrer and a Flow Record & Control system is used All fluxes, pressure and temperatures into the autoclave are controlled via DCS PC. Before each test, the autoclave is cleaned with hot nitrogen (1.5 barg $N_2$, 70° C., 1 hour). Then, 1350 g of 1-butene and 6 mmol of Al(i-Bu)$_3$ (as a 1M solution in hexane) are charged at room temperature. Then, the autoclave is thermostated at the polymerization temperature, the solution containing the catalyst/cocatalyst mixture prepared above is injected into the autoclave through a stainless-steel vial by means of nitrogen pressure. The polymerization reactions are carried out at 70° C. for 1 h. Then, stirring is interrupted, and the pressure into the autoclave is raised to 20 bar-g with nitrogen. The 1-butene/poly-1-butene mixture is discharged from the bottom into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C. The polymerization conditions and the characterization data of the obtained polymers are reported in Table 5.

TABLE 5

| comp | activity kg/($g_{met}$*h) | I.V. dL/g (THN) | $M_w/M_n$ | $T_m$ (II) ° C. | $\Delta H_f$ (II) J/g | $\Delta H_c$ (II) J/g |
|---|---|---|---|---|---|---|
| 6* | 98.7 | 1.4 | 2.0 | 106.5 | 19.12 | −18.3 |

*catalyst solution aged 24 hours

The reactor composition prepared as above was subjected to xylene extraction at 0° C. according to the procedure described above. The characterisation of the two fractions is reported in table 6.

TABLE 6

| composition | | NMR % | I.V. dL/g (THN) | $M_w/M_n$ | enthalpy ($\Delta H_f$). | cristallinity (IR) | Tm ° C. |
|---|---|---|---|---|---|---|---|
| comp 6 | comp a 43% | rr 29 | 1.4 | 2.0 | n.d. | 0.030 | n.d. |
| | comp b 57% | mmmm 98 | 1.4 | 2.0 | n.a. | n.a. | 106.5 | n.d. not detectable
n.a. not available

Sample of the reactor composition obtained above was subjected to Soxhlet extraction with diethyl ether for 12 hours. The extract was evaporated in order to isolate the soluble fraction. This ether soluble fraction amount to 28 weight % is fully amorphous other than atactic having a cristallinity (IR) of 0.024%.

The invention claimed is:

1. A 1-butene polymers composition comprising:
   a) from 5% by weight to 95% by weight of an atactic 1-butene-based polymer selected from an atactic homopolymer of 1-butene or an atactic copolymer of 1-butene containing up to 50% by mol of at least one alpha olefin selected from ethylene, propylene and alpha olefins of formula $CH_2=CHZ$, wherein Z is a $C_3$-$C_{10}$ alkyl group, component a) comprising:
      i) a distribution of molecular weight Mw/Mn no greater than 4;
      ii) rr triads, measured by $^{13}$C-NMR comprised between 5% and 50%;
      iii) no enthalpy of fusion detectable at a differential scanning calorimeter (DSC);

iv) an intrinsic viscosity (IV) measured in tetrahydronaphtalene (THN) at 135° C. comprised between 1.0 dl/g and 5.0 dl/g; and
v) an infrared crystallinity lower than 0.5%; and
b) from 5% by weight to 95% by weight of an isotactic 1-butene-based polymer selected from isotactic homopolymer of 1-butene, isotactic copolymer of 1-butene containing up to 5% by mol of ethylene derived units, isotactic copolymer of 1-butene containing up to 50% by mol of propylene derived units or an isotactic copolymer of 1-butene and at least one alpha olefin of formula $CH_2=CHZ$, wherein Z is a $C_3$-$C_{10}$ alkyl group, containing up to 20% by mol of derived units of said alpha-olefins, component b) comprising:
i) isotactic pentads (mmmm) measured by $^{13}C$-NMR, higher than 80%;
ii) a melting point higher than 80° C.; and
iii) an intrinsic viscosity (IV) measured in tetrahydronaphtalene (THN) at 135° C. comprised between 0.1 dl/g and 5 dl/g.

2. The 1-butene polymers composition according to claim 1 wherein in the component a):
i) the distribution of molecular weight (Mw/Mn) is lower than 3;
ii) the rr triads is comprised between 20% and 30%; and
v) the infrared crystallinity is lower than 0.3%.

3. The 1-butene polymers composition according to claim 1 wherein in the component b):
i) the isotactic pentads (mmmm) measured by $^{13}C$-NMR, is higher than 85%;
ii) the melting point is higher than 90° C.; and
iii) the intrinsic viscosity (IV) measured in tetrahydronaphtalene (THN) at 135° C. is comprised between 0.5 dl/g and 4 dl/g.

4. The 1-butene polymers composition according to claim 3 wherein component b) further comprises a molecular weight distribution (Mw/Mn) no greater than 5.

5. The 1-butene polymers composition according to claim 3 wherein component b) further comprises a molecular weight distribution (Mw/Mn) higher than 3.

6. The 1-butene polymers composition according to claim 1 wherein component a) is an atactic homopolymer of 1-butene.

7. The 1-butene polymers composition according to claim 1 wherein component b) is an isotactic homopolymer of 1-butene.

8. The 1-butene polymers composition according to claim 1 wherein component a) ranges from from 20% to 80% by weight and component b) ranges from 80% to 20% by weight.

9. A process for producing a 1-butene polymers composition comprising contacting at least one monomer under polymerization conditions in the presence of a catalyst system containing at least one transition metal organic compound, the 1-butene polymers composition comprising:
a) from 5% by weight to 95% by weight of a 1-butene-based polymer selected from an atactic homopolymer of 1-butene or an atactic copolymer of 1-butene containing up to 50% by mol of at least one alpha olefin selected from ethylene, propylene and alpha olefins of formula $CH_2=CHZ$, wherein Z is a $C_3$-$C_{10}$ alkyl group, component a) comprising:
i) a distribution of molecular weight Mw/Mn no greater than 4;
ii) rr triads, measured by $^{13}C$-NMR comprised between 5% and 50%;
iii) no enthalpy of fusion detectable at a differential scanning calorimeter (DSC); and
iv) an intrinsic viscosity (IV) measured in tetrahydronaphtalene (THN) at 135° C. comprised between 1.0 dl/g and 5.0 dl/g; and
v) an infrared crystallinity lower than 0.5%; and
b) from 5% by weight to 95% by weight of an isotactic 1-butene-based polymer selected from isotactic homopolymer of 1-butene, isotactic copolymer of 1-butene containing up to 5% by mol of ethylene derived units, isotactic copolymer of 1-butene containing up to 50% by mol of propylene derived units or an isotactic copolymer of 1-butene and at least one alpha olefin of formula $CH_2=CHZ$, wherein Z is a $C_3$-$C_{10}$ alkyl group, containing up to 20% by mol of derived units of said alpha-olefins, component b) comprising:
i) isotactic pentads (mmmm) measured by 13C-NMR, higher than 80%;
ii) a melting point higher than 80° C.; and
iii) an intrinsic viscosity (IV) measured in tetrahydronaphtalene (THN) at 135° C. comprised between 0.1 dl/g and 5 dl/g;
wherein components a) and b) are obtained simultaneously in the same reactor.

10. The process for producing a 1-butene polymers composition according to claim 9 wherein the catalyst system is obtained by contacting:
a) at least a metallocene compound of formula (Ia) in the meso or meso-like form:

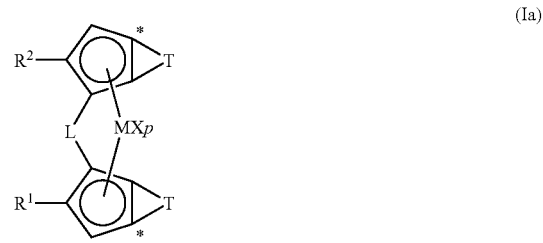

(Ia)

wherein
M is an atom of a transition metal selected from those belonging to group 3, 4, 5, 6 or to the lanthanide or actinide groups in the Periodic Table of the Elements;
p is an integer from 0 to 3, being equal to the formal oxidation state of the metal M minus 2;
X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals;
optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals;
L is a divalent $C_1$-$C_{40}$ hydrocarbon radical optionally containing heteroatoms belonging to groups 13-17 of the Periodic Table of the Elements or a divalent silylidene radical containing up to 5 silicon atom;
$R^1$ and $R^2$, equal to or different from each other, are $C_1$-$C_{40}$ hydrocarbon radicals optionally containing heteroatoms belonging to groups 13-17 of the Periodic Table of the Elements;

T, equal to or different from each other, is a moiety of formula (IIb) or (IIc):

wherein the atom marked with the symbol * bonds the atom marked with the same symbol in the compound of formula (Ia);

$R^3$ is a $C_1$-$C_{40}$ hydrocarbon radical optionally containing heteroatoms belonging to groups 13-17 of the Periodic Table of the Elements;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements;

$R^5$ is a $C_1$-$C_{40}$ hydrocarbon radical optionally containing heteroatoms belonging to groups 13-17 of the Periodic Table of the Elements;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements;

b) at least a metallocene compound of formula (Ib) in the racemic (rac) or racemic-like form

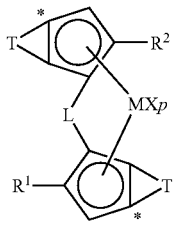

wherein the atoms marked with the symbol * bonds the atom marked with the same symbol in the moieties of formula (IIb) or (IIc); and c) an alumoxane or a compound that forms an alkyl metallocene cation.

11. The process according to claim 10 wherein the catalyst system further comprises an organo aluminum compound.

12. The 1-butene polymers composition according to claim 1, further comprising a molecular weight distribution (Mw/Mn) of the composition lower than 3.5, the 1-butene polymer being obtained by a process comprising contacting at least one monomer under polymerization conditions in the presence of a catalyst system containing at least one transition metal organic compound, the 1-butene polymers composition comprising:

a) from 5% by weight to 95% by weight of a 1-butene-based polymer selected from an atactic homopolymer of 1-butene or an atactic copolymer of 1-butene containing up to 50% by mol of at least one alpha olefin selected from ethylene, propylene and alpha olefins of formula $CH_2=CHZ$, wherein Z is a $C_3$-$C_{10}$ alkyl group, component a) comprising:
  i) a distribution of molecular weight Mw/Mn no greater than 4;
  ii) rr triads, measured by $^{13}$C-NMR comprised between 5% and 50%;
  iii) no enthalpy of fusion detectable at a differential scanning calorimeter (DSC);
  v) an infrared crystallinity lower than 0.5%; and
b) from 5% by weight to 95% by weight of an isotactic 1-butene-based polymer selected from isotactic homopolymer of 1-butene, isotactic copolymer of 1-butene containing up to 5% by mol of ethylene derived units, isotactic copolymer of 1-butene containing up to 50% by mol of propylene derived units or an isotactic copolymer of 1-butene and at least one alpha olefin of formula $CH_2=CHZ$, wherein Z is a $C_3$-$C_{10}$ alkyl group, containing up to 20% by mol of derived units of said alpha-olefins, component b) comprising:
  i) isotactic pentads (mmmm) measured by 13C-NMR, higher than 80%;
  ii) a melting point higher than 80° C.; and
  iii) an intrinsic viscosity (IV) measured in tetrahydronaphtalene (THN) at 135° C. comprised between 0.1 dl/g and 5 d/g wherein components a) and b) are obtained simultaneously in the same reactor, wherein the catalyst system is obtained by contacting:

(a1) at least a metallocene compound of formula (Ia) in the meso or meso-like form:

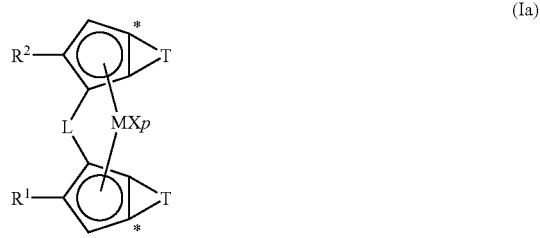

wherein

M is an atom of a transition metal selected from those belonging to group 3, 4, 5, 6 or to the lanthanide or actinide groups in the Periodic Table of the Elements;

p is an integer from 0 to 3, being equal to the formal oxidation state of the metal M minus 2;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom;

$R^1$ and $R^2$, equal to or different from each other, are $C_1$-$C_{40}$ hydrocarbon radicals optionally containing heteroatoms belonging to groups 13-17 of the Periodic Table of the Elements;

T, equal to or different from each other, is a moiety of formula (IIb) or (IIc):

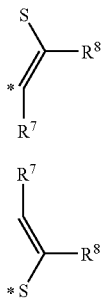

(IIb)

(IIc)

wherein the atom marked with the symbol * bonds the atom marked with the same symbol in the compound of formula (Ia);

$R^3$ is a $C_1$-$C_{40}$ hydrocarbon radical optionally containing heteroatoms belonging to groups 13-17 of the Periodic Table of the Elements;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements;

$R^5$ is a $C_1$-$C_{40}$ hydrocarbon radical optionally containing heteroatoms belonging to groups 13-17 of the Periodic Table of the Elements;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements;

(b1) at least a metallocene compound of formula (Ib) in the racemic (rac) or racemic-like form

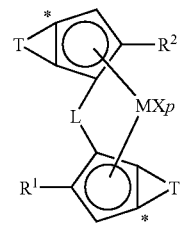

(Ib)

wherein the atoms marked with the symbol * bonds the atom marked with the same symbol in the moieties of formula (IIb) or (IIc); and (c1) an alumoxane or a compound that forms an alkyl metallocene cation.

* * * * *